May 9, 1939.  W. F. WICHART  2,157,445
METHOD FOR DETERMINING "WOW"
Filed Jan. 24, 1938

Inventor;
William F. Wichart,
by Arthur J. Farnsworth.
Attorney.

# UNITED STATES PATENT OFFICE 2,157,445

METHOD FOR DETERMINING "WOW"

William F. Wichart, Los Angeles, Calif.

Application January 24, 1938, Serial No. 186,678

8 Claims. (Cl. 73—51)

My invention relates to methods for determining whether variations of angular velocity exist in the operation of rotary equipment; and for approximately indicating the relative amount and the characteristics thereof. It will be found to be especially useful for such purposes as the selection of rotary devices for recording and reproducing sound.

In the use of certain classes of rotary equipment, it has become somewhat common practice to designate variations in angular velocity by the very convenient term "wow"; and I shall employ that term herein, in that way.

The principal objects of my invention include; first, to provide an improved visual method for indicating wow, with a practically useful degree of accuracy and sensitivity; second, to make it possible, in such a method to magnify the effects of wow, in order to better accomplish the first stated object; and, third, to accomplish both stated objects in a method which requires only simple, portable, and relatively inexpensive apparatus.

My objects are attained in the manner described below; and may be accomplished by the use of such devices as those illustrated in the accompanying drawing, in which—

Figure 2:
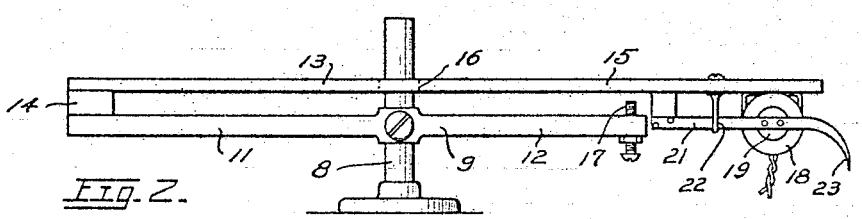
Figure 2 is a conventional elevation of appropriate apparatus for making the type of test record illustrated in Fig. 1.
Figure 1:
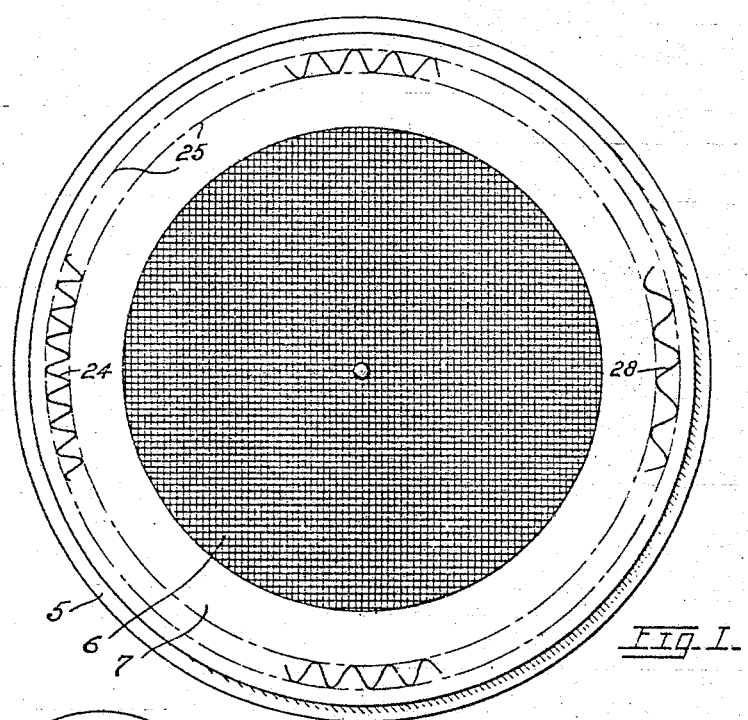
Figure 1 is a conventional plan view of a turntable with a recording disk thereon, showing the general character of one type of test record I may produce in carrying out my method.

In ordinary stroboscopic and other testing, of the general nature of that now being considered, a pre-made test record is employed. Such a record has a rotatable surface which carries a recurring pattern characterized by geometrically equal spacing between all corresponding pairs of points. This pattern has to be accurately and co-axially positioned upon the rotary part to be tested, so as to rotate therewith; and, while rotating in the manner being tested, it may be viewed stroboscopically, for brief intervals recurring at a constant periodicity which closely approximates that of the average time of recurrence of corresponding points on the test record, or it may be otherwise examined, as a basis for the wow test.

In the use of such a stroboscopic method in the simple case where the angular velocity of the rotary part under test increases and decreases by equal amounts once per revolution, and always at the same rates and angular positions; the entire test record, everywhere to the same extent, will stroboscopically appear to alternately advance and recede in a regular periodic manner, more or less slightly according to the changes in angular velocity.

In my present improved method, the test record is applied directly to the rotary part under test, or to a co-axial surface attached thereto and rotated thereby; while the rotary part is revolving in the manner being investigated, and by application means having a constant periodicity of recurrence Such a record will, in itself, indicate variation of angular velocity, by variations of spacing between corresponding pairs of record points. In the same simple case of variations in angular velocity as that considered before, the record spacings will alternately expand and contract when viewed stroboscopically for brief intervals recurring at the same constant periodicity as that of the record application means; but the alternate speeding up and slowing down of the angular velocity will show up as advancing and receding movements of the record, concentrated at that portion of the circumference which is opposite the position where the record was applied. At the point of application, the record will appear to be stationary. Moreover, the apparent alternate movements of the record will be greatly magnified; and this fact gives my method far greater sensitivity than that possessed by the methods which have been used hitherto. This magnification, and the reason therefor, will be discussed more in detail below.

It will be obvious now, that the essential steps in my method are; to record a series of equal time intervals, as angularly spaced marks on a rotating surface under test; and to stroboscopically view these marks at the same time intervals, at points which are angularly spaced from the point whereat the record was applied. The recordings may take various forms, such as a series of dots or any small mark, radial lines, or some of the very convenient quasi-sinusoidal curves. The record application means may comprise a tuned reed, a neon lamp, or some other device which operates at constant frequency.

For the purposes of this disclosure, it will be assumed that a turntable 5 is to be tested for wow. A suitable disk 6 is placed concentrically upon the turntable; and a concentric band 7, of material which is adapted for recording, is applied to the outer portion of the disk. I have found that a polished disk of black Bakelite is particularly satisfactory for this purpose, and that excellent material for the recording band is a thin mixture of titanium dioxide in alcohol. Such a mixture dries rapidly, leaves a dense white deposit which clings to the disk, and the deposit may easily be scratched through by a recording stylus. The mixture may be applied with a soft paint brush, preferably starting at the outside edge of the revolving disk and working inwardly. A record made on such a band, by scratching through the material thereof, will appear as a black mark on a white ground.

The timing apparatus illustrated in Fig. 2 comprises a standard 8, supporting a vertically positionable member 9, the latter having rigid opposed lateral arms 11 and 12. A resilient, spaced and parallel lever 13, is attached at its left hand end to the extremity of arm 11, as at 14. Lever-end 15, at the right, extends beyond arm 12; and standard 8 passes through a central hole of the lever with ample clearance, as indicated by dotted lines at 16. Thus lever-end 15 may be readily depressed, as by simultaneously gripping it and arm 12, and squeezing them together. The amount of such depression may be limited by an adjustable stop, as at 17.

Lever-end 15 is shown supporting an alternating current magnet coil 18; and also its co-axial armature 19, which is carried by a flat vibratory spring 21. The effective length of this spring may be adjusted for tuning purposes, as by a longitudinally positionable bifurcated regulating device at 22. Spring 21 is equipped with a downwardly directed recording stylus 23 at its free extremity.

The frequency of ordinary 60 cycle commercial current is practically constant. If such energy is used for testing purposes, and turntable 5 revolves at a speed which is customary for apparatus of that character, it may be preferable to tune vibratory spring 21 to a natural frequency of 120 double vibrations per second. In any case, the natural frequency of this spring preferably is adjusted so as to be a simple multiple, or sub-multiple, of the alternating current frequency employed.

In order to make a wow test record on band 7, the apparatus of Fig. 2 is positioned so that stylus 23 will be over the band, and adapted to vibrate in a direction which is substantially radial with respect to disk 6. Then, while the turntable is being revolved in its normal manner by the mechanism being tested for wow, lever-end 15 is pressed down for a small interval of time, corresponding to about one revolution of the turntable, more or less. This will result in recording a quasi-sinusoidal wave pattern on band 7; similar to that shown at 24, and extending more or less completely around the disk, as indicated by broken lines 25.

Figure 3:
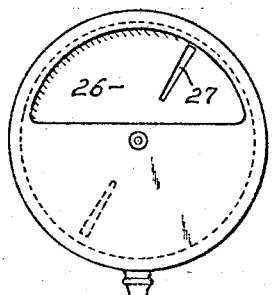
Figure 3 is a face view of a convenient form of stroboscope for examining my records to complete the wow test.

For viewing and interpreting such a record, an instrument like that of Fig. 3 may be employed. This is a portable hand stroboscope, comprising; a rotatable opaque disk 26, with radial slots 27 therethrough; and a small synchronous motor (not shown) for driving the disk. The stroboscope is actuated in use, by the same source of alternating energy that was employed for vibrating stylus 23.

It will be understood by those familiar with the art involved, that, when the rotary speed of the turntable increases, the wave length of my record will increase proportionally, as at 28. Conversely, when the turntable speed decreases, the wave length will decrease in the same proportion. If turntable 5, with its driving means, is wowless, the wave length of the record will be uniform throughout; i. e., the spacing between any pair of corresponding points will be the same at all angular positions. Such a record, when viewed through the stroboscope, will appear to be stationary at all points. On the other hand, when wow is present, the spacing between corresponding pairs of points of the record will vary; and stroboscopic viewing will make the record appear to alternately advance and recede at certain angular positions.

If the turntable varies in angular velocity once per revolution, and always at the same angular position; stroboscopic viewing of the record will show, by its point of greatest movement, where there is the greatest change in angular velocity with respect to that at the starting position.

If the turntable varies in angular velocity in some irregular manner, stroboscopic viewing of the record will show irregular movements at various points around the circle. Wow records which are taken on belt-driven turntables, often show such effects.

In practical use, one soon learns to recognize characteristic appearances of records taken in the manner described, and to understand the causes thereof.

The achievement of the second stated object of my invention, namely, virtual magnification of the effects of wow in a stroboscopically viewed visual record thereof, is a matter of great practical importance. This virtual magnification is brought about in the following manner:

As viewed through the stroboscope, my records of regularly recurring speed variations during a single revolution, appear to be stationary at the angular position where the record was applied. Any changes in angular velocity which may occur at that position, will be entirely neutralized, so far as stroboscopic viewing is concerned, by corresponding contractions or expansions of the wave length of the record. Opposite this position, however, i. e., at 180° therefrom, a magnified stroboscopic movement will be seen if there was any change in angular velocity at the application point. For example, if the angular velocity is reduced at the point where the record is applied, it must have been correspondingly increased, with correspondingly greater wave length, at the opposite position. When this greater wave length is seen at the reduced velocity, the effect is additive. Consequently there will be a magnified stroboscopic movement at the point of the record opposite from that of its application.

It will be obvious that continuous wow records, of more than one revolution, are available by my method; either by allowing an overlap, or by recording in the form of a spiral.

My method is applicable, possibly with slight modifications which will readily occur to those having occasion to use it, wherever it is important to determine the degree of constancy of rotative speeds, or to obtain an indication of the causes of inconstancy thereof. It may also be used, in a reverse sense, for analysis of vibration constancy, whenever a source of constant rotative speed is available.

The examples of rotary speed variation hitherto mentioned, have contemplated only one regularly recurring increase and decrease in angular velocity per revolution. If two such variations should occur per revolution, a quadrant appearance of the record would result. Stroboscopically viewed, the last said record would show two opposite points (the point of application and the point 180° therefrom) having no movement; and two other opposite points (90° from the first two) would have a magnified movement. If the angular velocity should vary in some irregular manner (as say, once per 1.2 revolutions; the point of greatest movement of the record, when seen stroboscopically, will come and go, rotate slowly, or vary in some other irregular manner, even at the point where the record was applied.

Having thus fully disclosed my invention, I claim:

1. A method for determining wow which includes; making a visual recurring record at constant frequency, on a rotating surface under test; and comparing corresponding spacings of said recurring record at different angular positions of the record.

2. A method for determining wow which includes; making a visual recurring record at constant frequency, on a rotating surface under test; and stroboscopically viewing at said frequency, the entire rotating record.

3. A method for determining wow which includes; making a visual recurring record at a known constant frequency, on a rotating surface under test; and viewing the entire rotating record through stroboscopic apertures, presented at said frequency.

4. A method for determining wow which includes; making a visual waveform record on a rotating surface under test, by recording means operating at a known constant frequency; and comparing stroboscopic movements at different angular positions of the rotating record, through stroboscopic apertures presented at said frequency.

5. A method for determining wow which includes; applying a band of material adapted for recording, on a rotary surface which is to be tested; making a visual record on said band co-axial with said surface, while the latter is rotating in the manner to be tested, by recording means operating at a known constant frequency; and comparing stroboscopic movements of the record at different angular positions thereof, while it is rotating in said manner, through stroboscopic apertures presented at said frequency.

6. A method for determining wow which includes; applying a contrastingly colored band of material adapted for recording, on a polished rotary surface which is to be tested; making a visual co-axial record by scratching through said material with a stylus vibrating at a known constant frequency, while said surface is rotating in the manner to be tested; and comparing stroboscopic movements of the record at different angular positions thereof, while it is rotating in said manner, through stroboscopic apertures presented at said frequency.

7. A method for determining wow which includes; applying a band of dense white pigment which may be easily removed by scratching, on a black polished rotary surface which is to be tested; making a visual co-axial waveform record by scratching through said material in a radial direction, with a stylus vibrating at a known constant frequency, while said surface is rotating in the manner to be tested; and comparing stroboscopic movements of the record at different angular positions thereof, while it is rotating in said manner, through stroboscopic apertures presented at said frequency.

8. A method for determining wow which includes; recording at equal time intervals, a series of angularly spaced marks on a rotating surface under test; and comparing corresponding spacings of such record at different angular positions thereof.

WILLIAM F. WICHART.